Patented Mar. 11, 1924.

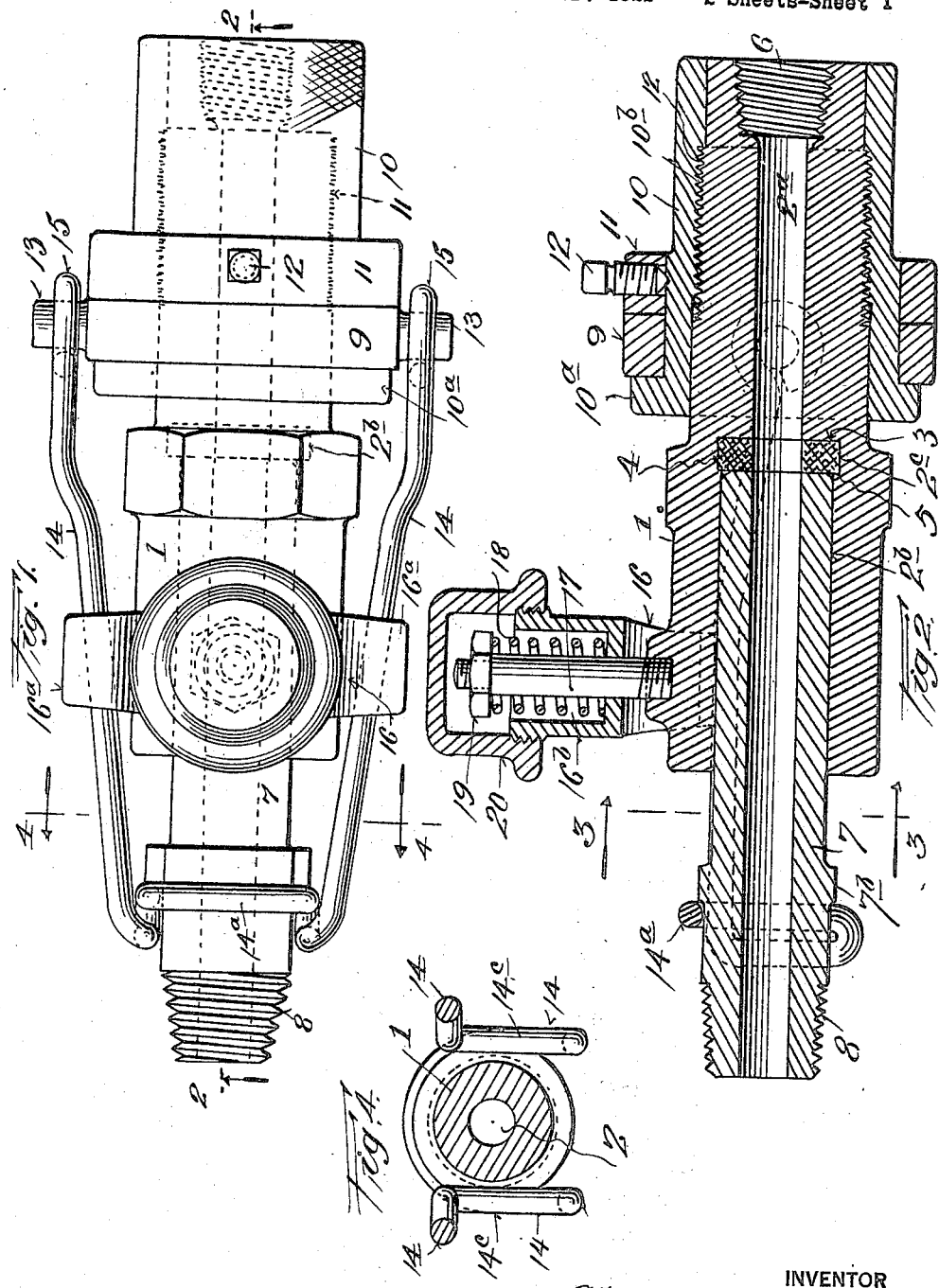

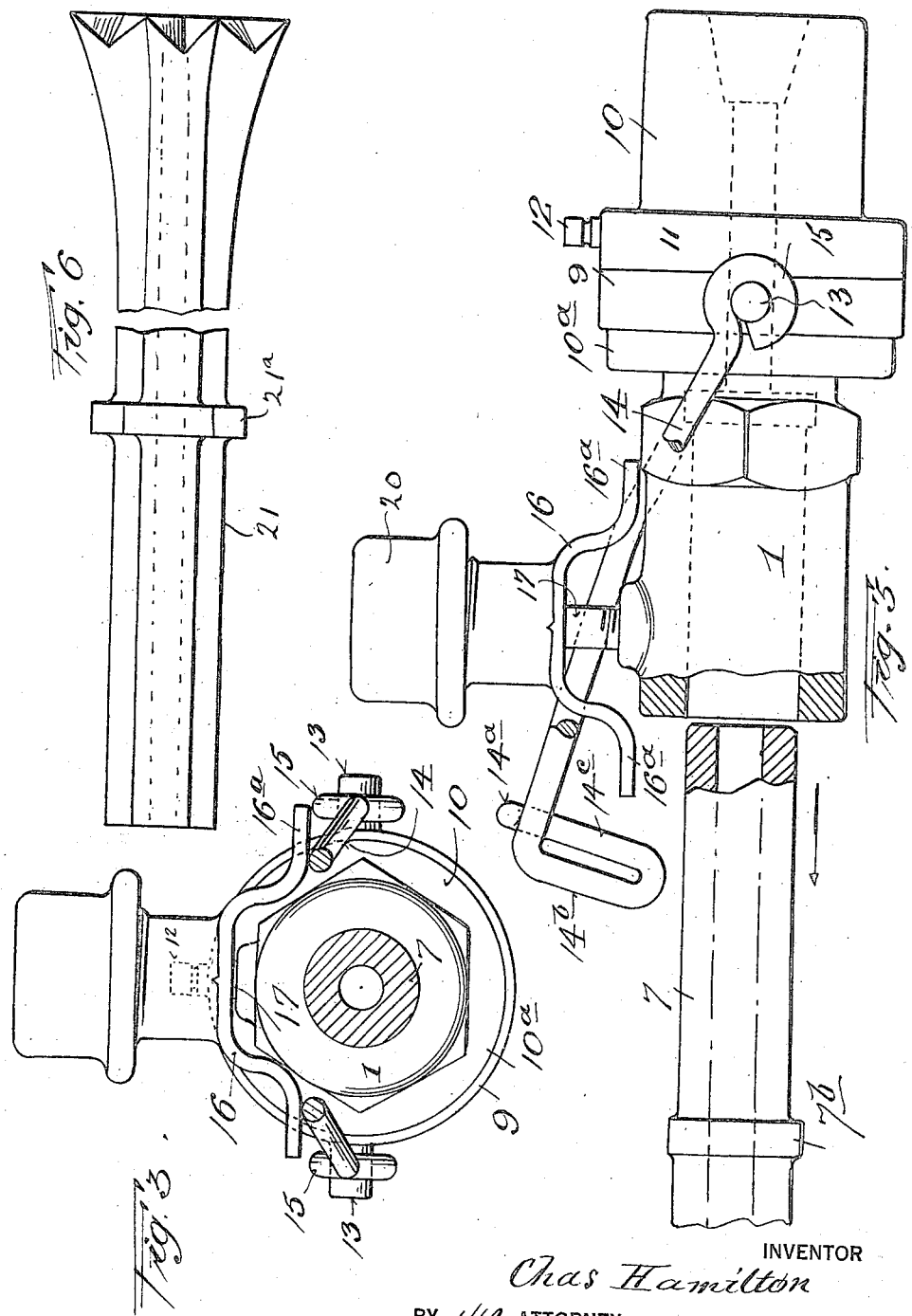

1,486,662

UNITED STATES PATENT OFFICE.

CHARLES HAMILTON, OF NEW YORK, N. Y.

FLUID COUPLING.

Application filed June 21, 1922. Serial No. 569,398.

*To all whom it may concern:*

Be it known that I, CHARLES HAMILTON, a citizen of the United States, and resident of New York city, borough of Manhattan, in the county of New York and State of New York, have invented certain new and useful Improvements in Fluid Couplings, of which the following is a specification.

The object of my invention is to provide a coupling adapted to detachably connect a hose and a tubular member with a fluid tight connection therebetween, whereby fluid, such as air or steam, under high pressure may flow from said coupling to such member, and whereby the coupling may be readily detached from such member and reapplied thereto. One of the features of my invention is that the coupling may be detachably connected with the aforesaid tubular member when the latter is attached to a rock drill to supply the latter with air or steam under pressure, and said coupling may be detached from said member and applied to a hollow or tubular drill to enable air or steam under pressure, and said coupling may be detached from said member and applied to a hollow or tubular drill to enable air or steam under pressure to be delivered through such drill to blow accumulated dust or other substances from the hole containing the drill to permit withdrawal of the drill from such hole.

My invention comprises novel details of improvement that will be more fully hereinafter set forth and then pointed out in the claims.

Reference is to be had to the accompanying drawings forming part hereof, wherein—

Fig. 1 is a plan view of my improvement;
Fig. 2 is a section on line 2—2 in Fig. 1;
Fig. 3 is a cross section on line 3—3 in Fig. 2;
Fig. 4 is a cross section on line 4—4 in Fig. 1;
Fig. 5 is a side view, partly in section, showing the parts in position for assembling or disassembling, and
Fig. 6 is a detail side view of a tubular drill.

Similar numerals of reference indicate corresponding parts in the several views.

The numeral 1 indicates the main body of my improved coupling which is shown provided with a longitudinal bore 2 preferably made of two different diameters, the portion $2^a$ of said bore being of less diameter than the portion $2^b$ of said bore. Between the portions $2^a$, $2^b$ is a recess $2^c$ that is greater in diameter than the portions $2^a$, $2^b$ of said bore, whereby a seat or shoulder 3 for a washer 4 is provided, a shoulder 5 also engaging said washer whereby the latter is retained in place. The washer 4 may be of leather or other suitable material and forced into the recess $2^c$. Body 1 is provided with a threaded portion at 6 communicating with bore 2 at one end of the body, which threads are adapted for connection with a coupling on a hose to connect body 1 with a source of fluid pressure, as with an air tank, air compressor or steam supply. A tubular member 7 is adapted to enter the bore portion $2^b$ of member 1 and to seat against washer 4 to make a tight fit therewith. Member 7 may be provided with threads 8 at its outer end to engage threads in a wall of a chest or other appropriate part of the casing of a rock drill or other machine to which fluid, such as air or steam, under pressure is to be delivered. Means are provided to rigidly and detachably retain the tubular member 7 in connection with body 1 to maintain a fluid tight fit at washer 4. I have shown a ring 9 loose on a nut-like member 10 that is provided with internal threads $10^b$ engaging external threads 12 on body 1. The member 10 is provided with an annular shoulder $10^a$ against which ring 9 bears, and at 11 is a ring mounted upon member 10 and shown provided with a set screw 12 to engage said body to retain ring 11 thereon. The construction described is such that member 10 may be rotated upon body 1 without rotation of ring member 9 which is retained loosely in position between shoulder $10^a$ and ring 11. The ring member 9 is provided with projections 13 on opposite sides upon which a yoke-like bail 14 is swivelled by means of eyes 15 at one end of said bail. The opposite or free end of said bail is shown provided with a jaw, indicated in the form of a cross bar at $14^a$, formed of the material of said bail. In the example illustrated the bail is made of wire having laterally extended arms $14^b$ spaced apart, from which extend arms $14^c$ to the adjacent ends of bar $14^a$, providing a space between the spaced arms to receive member 7, whereby the bar 14ᵃ may rest upon said member in co-operation with an annular shoulder 7ᵇ on said member, and the arms resist side movement of the bail. The bail 14 may be made of wire having two main side arms provided each with an eye 15, said wire being bent at the outer end of each such side arm to provide the arms 14ᵇ, 14ᶜ and the connecting bar 14ᵃ.

When the member 7 is within the bore of body 1 the yoke-like bail 14 may be swung against the member 7, beyond its shoulder 7ᵇ, to enable the arms 14ᶜ and the cross bar 14ᵃ to engage said shoulder, the nut 10 having been advanced sufficiently along body 1 for the purpose, and then said nut will be moved outwardly along the body to draw the parts 14ᵃ, 14ᶜ of member 14 against shoulder 7ᵇ to force the inner end of member 7 against washer or packing 4 to make a fluid tight fit thereat.

In order to retain the yoke-like bail 14 in set position against shoulder 7ᵃ of member 7 I provide a clip or stop 16 movably carried by body 1 to bear upon the side arms of bail 14. In the construction shown the clip or stop 16 has feet 16ᵃ at opposite ends to rest upon the side arms of bail 14 when said clip extends transversely respecting body 1, (Fig. 1), and to release said side arms when the clip extends longitudinally respecting body 1, as illustrated in Fig. 5. Clip 16 is guided by a stud 17 extending from member 1, and spring 18 bears against said clip and against a stop 19, shown in the form of a nut, on stud 17. The clip 16 is shown provided with a recess 16ᵇ in a projection 16ᶜ receiving stud 17 and spring 18, and a cap 20 is detachably secured on projection 16ᶜ to prevent dust entering said recess. The clip may be pulled out against the spring and rotated to engage or release the bail. The springs retards the clip in set position.

When it is desired to connect the coupling with member 7, the clip 16 is released from bail 14, member 7 is slid into the bore of body 1 the bail is placed in connection with member 7 and its shoulder 7ᵇ, and nut 10 is rotated to draw the bail against shoulder 7ᵇ to secure the inner end of member 7 against washer 4. The clip 16 is then replaced with its feet resting against bail 14. Fluid under pressure may then flow through the coupling to member 7 and thence to the air or steam chest of a rock drill or other machine to which member 7 is attached.

One of the advantages of my invention is that coupling body 1 may be readily detached from member 7 by disconnecting bail 14 from said member and withdrawing body 1 without requiring member 7 to be disconnected from said chest. A further important advantage is that body 1 may be attached to a tubular drill, such as illustrated in Fig. 6, for the purpose of blowing air or steam through the bore of said drill. The drill 21, which may be of any well-known or desired construction, is shown provided with a shoulder 21ᵃ, similar in function in connection with my improvements to the shoulder 7ᵇ of member 7. In case it is desired to blow dust or other material from the hole in which the drill is located the body 1 of my improvement may be applied to the upper end of the drill by inserting said drill end into the bore of body 1 and attaching the bail 14 to shoulder 21ᵃ of the drill, in manner described with respect to member 7, to cause the adjacent end of the drill to be forced against washer 4 to make a tight fit thereat. Air or steam under pressure may be forced from body 1 into the drill and such air or steam, issuing from the lower end of the bore in the drill, will force or blow sand or other material from the drill hole. It sometimes occurs that drills will become stuck in rock by reason of an accumulation of dust, mud or the like in the drilled hole, and by means of my improvement dust, mud and the like may be blown from such hole to release the drill.

I claim—

1. A coupling comprising a body having a bore, means within said bore to co-operate with a tubular member to make a tight fit therebetween, a bail upon the body adapted to co-operate with said member, and means co-operative between the body and the bail to move the latter along the body while the bail engages the member to tighten and retain said member in connection with said body.

2. A coupling comprising a body having a bore adapted to receive a tubular member having a shoulder, means within the bore to co-operate with said member to make a tight fit therebetween, a bail movably carried by the body and having a portion to engage the shoulder of said member, and means co-operative with said body and said bail for moving the latter along the body while the bail engages the member to tighten and retain said member in connection with the body.

3. A coupling comprising a body having a bore adapted to receive a tubular member having a shoulder, a washer within the bore to co-operate with said member, a bail having spaced side arms and means at one end to engage said shoulder, a ring journaled around the body and movably connected with said bail, and means to adjust said ring in the direction of the length of the body while the bail engages the member and retain the ring in set position.

4. A coupling comprising a body having a bore adapted to receive a tubular member having a shoulder, a washer within the bore to co-operate with said member, a bail having means at one end to engage said shoulder, a nut operative upon said body, a ring journaled on the nut, and means movably connecting the bail with said ring.

5. A coupling comprising a body having a bore adapted to receive a tubular member having a shoulder, means to effect a tight fit between said body and member, a nut upon said body, a ring journaled on the nut, means to retain the ring in operative position on the nut, and a bail having side arms pivotally connected with said ring, said bail having spaced arms and a cross bar therebetween at its end opposite the ring to cooperate with said shoulder.

6. A coupling comprising a body having a bore adapted to receive a tubular member having a shoulder, means to effect a tight fit between said body and member, a nut upon said body, a ring journaled on the nut, means to retain the ring in operative position on the nut, said ring having projections on opposite sides, and a bail having side arms provided with eyes journaled on said projections, said bail at the end opposite its eyes having a jaw to receive said member and engage its shoulder.

7. A coupling comprising a body having a bore to receive a tubular member, a bail movably carried by the body and having means to cooperate with said member, a clip carried by the body and provided with feet to engage the side arms of the bail, and means movably supporting the clip upon the body to permit the clip to release the bail.

8. A coupling comprising a body having a bore to receive a tubular member, a bail movably carried by the body and having means to co-operate with said member, a clip carried by the body and provided with feet to engage the side arms of the bail, a stud upon the body, said clip being movably supported by the stud, said stud having a stop, and a spring co-operative between said clip and stop to permit the clip to be adjusted with respect to the bail and out of co-action therewith.

9. A coupling as specified in claim 8 in which the clip has a projection provided with a recess receiving said spring, and a cap upon said projection to close said recess.

CHARLES HAMILTON.